United States Patent [19]

Bilgrien et al.

[11] Patent Number: 5,153,238

[45] Date of Patent: Oct. 6, 1992

[54] STORAGE STABLE ORGANOSILOXANE COMPOSITION AND METHOD FOR PREPARING SAME

[75] Inventors: Carl J. Bilgrien; Chi-long Lee, both of Midland; Steven P. Mullan, Sanford; Herschel H. Reese, Midland, all of Mich.

[73] Assignee: Dow Corning Corporation, Midland, Mich.

[21] Appl. No.: 790,043

[22] Filed: Nov. 12, 1991

[51] Int. Cl.$^5$ ................................................ C08K 9/10
[52] U.S. Cl. .................................... 523/211; 524/588; 525/474; 525/478
[58] Field of Search ......................... 523/211; 524/588; 525/474, 478

[56] References Cited

U.S. PATENT DOCUMENTS 4,742,142  5/1988  Shimizu et al. ..................... 525/478
4,766,176  8/1988  Lee et al. ............................. 525/478
5,015,691  5/1991  Lewis et al. ......................... 525/478
5,015,716  5/1991  Togashi et al. ..................... 525/478

Primary Examiner—John C. Bleutge
Assistant Examiner—Karen A. Hellender
Attorney, Agent, or Firm—Robert Spector

[57] ABSTRACT

Storage stable and gel-free organosiloxane compositions in the form of flowable powders are prepared by blending a high consistency polydiorganosiloxane into a quantity of fluidized reinforcing filler that is heated to a temperature of from 100° to 200° C. prior to or immediately following introduction of the polydiorganosiloxane. When silica is the reinforcing filler, the filler is typically treated with an anti-creping agent either prior to or during this blending process. The resultant mixture is heated while being subjected to shearing forces that reduce its average particle size to achieve a flowable powder.

10 Claims, No Drawings

STORAGE STABLE ORGANOSILOXANE COMPOSITION AND METHOD FOR PREPARING SAME

BACKGROUND OF THE INVENTION

1. Field of the Invention

This invention relates to heat curable elastomer compositions. More particularly, this invention relates to storage stable, heat curable organosiloxane compositions in the form of a finely divided, free flowing powder. The compositions comprise a high consistency polydiorganosiloxane and a reinforcing silica filler. Optional ingredients include but are not limited to filler treating agents, non-reinforcing fillers, curing agents and/or curing catalysts.

2. Background Information

Organosiloxane compositions in the form of a free-flowing powder prepared from a high consistency "gum-type" polydiorganosiloxane and a reinforcing filler are described in a number of publications, including U.S. Pat. No. 3,824,208, which issued to Link and Scarbel on Jul. 16, 1974 and Japanese patent publication no. 2/102007, which was published on Apr. 13, 1990.

In accordance with the teaching of Link and Scarbel in the aforementioned patent, a powdered material is obtained by first reducing the particle size of the polydiorganosiloxane to within the range of from 0.1 micron to 25.4 mm. by suitable means and then mixing the particles with at least 15 parts by weight of a reinforcing filler. This operation is conducted at a temperature of from 0 to 100 degrees C. preferably from 20 to 60 degrees C. A second critical process parameter in addition to the temperature is the speed of the tip of the blade in the mixer or other device used to subdivide the polymer and blend it with the filler during preparation of the powdered material. In accordance with the teaching of the patent, this speed can generally range from 50 to 150 feet per second and is preferably from 70 to 150 feet per second.

Japanese patent publication no. 2/102007 teaches pelletizing a high consistency or "gel" type vinyl-containing polydiorganosiloxane having a viscosity of at least $1 \times 10^5$ centipoise and then blending the resultant pellets with a filler. A processing aid is included to prevent a phenomenon referred to as "creping" or "crepe hardening". The resultant mixture is then fed into a mixing apparatus equipped with a high speed rotating blade that is capable of subjecting the mixture to high speed mechanical shearing. During this step of the process the mixture achieves the consistency of a free-flowing powder. The critical parameters for obtaining a free flowing powder are the speed of the blade tip and the residence time of the mixture in the mixing apparatus.

The Japanese patent publication also teaches that to achieve a homogeneous powdered material the temperature of the polymer-filler blend during shearing can be from 10° to 100° C. The temperature is preferably maintained near ambient by cooling the mixture as it is being converted to a powder.

Elastomers prepared using curable compositions prepared as described in the aforementioned United States patent and Japanese patent publication have a number of shortcomings, one of the more obvious being the presence of undesirable gel particles.

The present inventors discovered that formation of gel particles in finely divided organosiloxane compositions can be avoided or substantially reduced by using a set of process conditions for preparing the compositions that is beyond the limits and conditions described in the prior art. In addition to elimination of the gel particles the physical properties of cured elastomers prepared from the composition are substantially improved.

One objective of this invention is to provide an improved method for preparing curable organosiloxane compositions in the form of a flowable powder.

A second objective is to provide storage stable curable organosiloxane compositions comprising at least one high consistency or liquid polydiorganosiloxane and a reinforcing silica filler. The compositions can optionally contain a curing agent and/or a curing catalyst. The powder compositions are subsequently converted to high consistency organosiloxane compositions by fusing or "massing" of the powder particles and cured to yield gel free elastomers exhibiting excellent physical properties.

SUMMARY OF THE INVENTION

Storage stable organosiloxane compositions in the form of flowable powders are prepared by blending a high consistency polydiorganosiloxane with a quantity of fluidized reinforcing filler that is heated to a temperature of greater than 100° up to 200° C. prior to or immediately following introduction of the polydiorganosiloxane. When silica is the reinforcing filler, the filler is typically treated with an anti-creping agent either prior to or during this blending process. The resultant mixture is heated while being subjected to shearing forces that reduce its average particle size to achieve a flowable powder.

DETAILED DESCRIPTION OF THE INVENTION

This invention provides a storage stable, gel-free organosiloxane composition in the form of a free-flowing powder exhibiting a particle size of from 10 to 1,000 microns, said composition comprising 1) 100 parts by weight of a high consistency polydiorganosiloxane, and 2) from 10 to 80 parts by weight of a reinforcing filler, said composition being characterized by the substantial absence of gel particles visible to the naked eye following fusion of said powder in the presence of a dye.

This invention also provides a method for preparing a one-part storage stable organosiloxane composition that is substantially free of gel particles visible to the naked eye following massing of said composition, the method comprising the following sequence of steps:

1) forming a mixture comprising 100 parts by weight of a high consistency polydiorganosiloxane and from 10 to 80 parts of a finely divided reinforcing filler by maintaining said filler in a highly turbulent, fluidized state and at a temperature of above 100° up to 200° C. prior to or immediately following blending of said filler with said polydiorganosiloxane, 2) maintaining said temperature and highly turbulent, fluidized state while subjecting said mixture to shearing forces sufficient to achieve an average particle size of from 1 to 1000 microns, and 3) isolating the resultant organosiloxane composition in the form of a flowable powder.

When the reinforcing filler is silica, the filler can be reacted with a filler treating agent. This treatment can occur while the silica is in a fluidized state and being blended with a polydiorganosiloxane and optionally other ingredients in accordance with the present method. Alternatively, the filler can be treated before being blended with the polydiorganosiloxane.

The features that distinguish the present method from prior art methods for preparing finely divided, free flowing blends containing at least one high consistency polydiorganosiloxane and a reinforcing or non-reinforcing filler, particularly the method described in the aforementioned U.S. Pat. No. 3,824,208, is the requirement for maintaining the mixture of polydiorganosiloxane and reinforcing filler in a highly turbulent, fluidized state and at a temperature of above 100° up to 200° C., preferably up to 150° C., while at the same time subjecting the mixture to the shearing forces required to reduce its particle size to the desired level. In addition, the filler is maintained within this temperature range and in a fluidized state prior to or immediately following blending of the filler with the polydiorganosiloxane. These process conditions avoid or at least minimize the formation of gel particles in the final composition.

The presence of gel particles can be determined by fusing a powdered organosiloxane composition in the presence of a dye to form a colored high consistency organosiloxane composition. Organic azo dyes are preferred for this purpose. The fused composition, preferably in the form of a film or sheet, is examined with the unaided eye to determine the presence of gel particles, which are colorless due to their inability to absorb the dye present in the composition. The fused massed composition can be cured before being examined to make it easier to handle.

High consistency organosiloxane compositions formed by fusing the present powders in the presence of a dye contain less than 1% by volume of undyed gel particles visible to the unaided eye. The fused composition are therefore characterized as being substantially free of these gel particles. Samples prepared using prior art powdered organosiloxane compositions and evaluated for gel content under the same conditions contain substantially more than 1 percent by volume of undyed gel particles. The accompanying examples demonstrate the adverse effect of these gel particles on the physical properties of cured elastomers. The ingredients of the present compositions and the individual steps of the method for preparing these compositions will now be explained in detail.

THE POLYDIORGANOSILOXANE

The ingredient that constitutes the major portion of the present compositions is a high consistency polydiorganosiloxane having the consistency of a gum. The molecular weight of this polymer is sufficient to impart a viscosity of from about 1,000,000 to about 100,000,000 centipoise to the polymer.

The viscosity of high consistency polydiorganosiloxanes is typically expressed in terms of a plasticity number that is determined as described in the Americal Society of Testing or Materials (ASTM) test method no. 926. The plasticity number is defined as the thickness in millimeters $\times 100$ of a cylindrical test specimen 2 cm$^3$ in volume and approximately 10 mm in height after the specimen has been subjected to a compressive load of 49 Newtons for a specified period of time at a specified temperature. The high consistency type of polydiorganosiloxanes that are be blended with reinforcing fillers to prepare the organosiloxane compositions of this invention typically exhibit a Williams plasticity of from about 150 to about 500.

The polydiorganosiloxane ingredient of the present compositions can be represented by the general formula $X(R^1R^2SiO)_nX$ where $R^1$ and $R^2$ represent identical or different monovalent substituted or unsubstituted hydrocarbon radicals, the average number of repeating units in the polymer, represented by n, is selected to provide the desired Williams plasticity value. The molecular weight of the polydiorganosiloxane in combination with the types and concentrations of repeating units in this polymer contribute to the properties of the final cured elastomer. The terminal group X represents a saturated or ethylenically unsaturated hydrocarbon radical or a hydroxyl group.

The relationship between the value of n in the general formula and the Williams plasticity of the polydiorganosiloxane is dependent upon the type of hydrocarbon radicals represented by $R^1$ and $R^2$. For polydimethylsiloxanes the value of n is typically from 500 to several thousand.

The type of group represented by X is determined by the curing reaction used to convert the polydiorganosiloxane to a cured elastomer. For example, when the composition is to be cured by a hydrosilylation reaction with an organohydrogensiloxane or a vinyl-specific peroxide, X is typically vinyl or other alkenyl radical.

The hydrocarbon radicals represented by $R^1$ and $R^2$ include alkyl and substituted alkyl radicals containing from 1 to 20 carbon atoms, alkenyl radicals such as vinyl and 5-hexenyl, cycloalkyl radicals such as cyclohexyl, and aromatic hydrocarbon radicals such as phenyl, benzyl and tolyl. Suitable substituents that can be present on $R^1$ and/or $R^2$ include but are not limited to the halogens, alkoxy and cyano groups. Preferred hydrocarbon radicals are lower alkyl containing from 1 to 4 carbon atoms, phenyl, and halogen-substituted alkyl such as 3,3,3-trifluoropropyl. Most preferably $R^1$ represents a methyl radical, $R^2$ represents at least one of methyl, phenyl and 3,3,3-trifluoropropyl radicals, and X and optionally one or more of the $R^2$ radicals represent alkenyl radicals.

The polydiorganosiloxane ingredient of the present compositions can be a homopolymer, a copolymer or a mixture containing two or more different homopolymers and/or copolymers. It should be evident that copolymer molecules contain two or more different types of repeating units represented by $R^1R^2SiO$, and that the molar ratios of the various units is determined by the properties of cured elastomers prepared from these compositions.

When the composition is intended to be cured by a hydrosilylation reaction, at least a portion of the polydiorganosiloxane ingredient can be a copolymer wherein X represents an alkenyl radical and a portion of the $R^2$ radicals on non-terminal silicon atoms are optionally ethylenically unsaturated radicals such as vinyl and hexenyl.

Methods for preparing high consistency (or "gum" type) polydiorganosiloxanes exhibiting Williams plasticity values of from about 150 to about 500 are sufficiently well known that they do not require a detailed discussion in this specification. One method for preparing these polymers is by the acid- or base-catalyzed polymerization of cyclic diorganosiloxanes that typically contain three or four siloxane units per molecule. A second method comprises replacing the cyclic polysiloxanes with the corresponding diorganodihalosilane(s)

and an acid acceptor. The polymerization is conducted under conditions that will yield the desired molecular weight.

THE REINFORCING FILLER

Polydiorganosiloxanes that are intended for curing to form elastomers typically contain from about 10 to about 80 weight percent, based on the weight of polydiorganosiloxane, of a reinforcing agent to provide useful levels of physical properties in the elastomer. One type of reinforcing agent includes resinous organosiloxane copolymers containing $R^3SiO_{\frac{1}{2}}$ and $SiO_{4/2}$ groups, where at least a portion of the R groups react with the polydiorganosiloxane and/or the curing agent during curing of the composition.

The reinforcing agents used in the present compositions are finely divided, heat stable minerals such as the fume and precipitated forms of silica, silica aerogels and titanium dioxide. Reinforcing fillers are typically characterized by surface areas greater than about 50 $m^2/gram$. The fume form of silica is a preferred reinforcing filler based on its availability, cost and high surface area, which can be up to 900 $m^2/gram$.

In accordance with the present method 100 parts by weight of one or more high consistency polydiorganosiloxanes is typically blended with from 10 to about 80 parts by weight of the reinforcing filler.

THE FILLER TREATING AGENT

Some reinforcing fillers, particularly the various forms of silica, require reaction with liquid organosilicon compounds containing silanol groups or hydrolyzable precursors of silanol groups to prevent a process referred to as "creping" or "crepe hardening" that often occurs when mixtures of these fillers and polyorganosiloxanes are stored for any appreciable period of time. Creping is characterized by a gradual increase in the viscosity or decrease in the plasticity of the organosiloxane composition. In some instances the process reaches the point at which it cannot be reversed by subjecting the composition to shearing forces using a rubber mill or sigma blade mixer.

Compounds that can be used as filler treating agents, also referred to as anti-creping agents, include but are not limited to low molecular weight liquid silanol- and alkoxy-terminated polydiorganosiloxanes, hexaorganodisiloxanes and hexaorganodisilazanes. Depending upon the properties desired in the final cured elastomer, some of the silicon-bonded hydrocarbon radicals in all or a portion of the filler treating agent can contain substituents such as carbon-carbon double bonds that react during curing of the composition.

The reinforcing filler used in the present method can be reacted with from 10 to about 45 weight percent, based on filler weight, of the filler treating agent prior to being blended with the polydiorganosiloxane to form the present compositions. Treatment of the filler can be carried out in the same mixing vessel used to prepare the finely divided organosiloxane compositions of this invention. The silica or other reinforcing filler is typically maintained at a temperature of from 100° to about 200° C. during the treatment process. When silica is used as the reinforcing filler, the treating agent is believed to react with free silanol ($\equiv SiOH$) groups on the surface of the silica particles.

If pre-treatment of the filler is not feasible or desireable, the filler can be treated while it is being blended with the high consistency polydiorganosiloxane during preparation of the present compositions. In accordance with a preferred embodiment of the present method, the filler treating agent is sprayed into the mixing chamber during blending of the reinforcing filler with the polydiorganosiloxane, while the filler and polydiorganosiloxane are in the highly turbulent, fluidized state characteristic of the present method.

Experimental data collected by the present inventors indicate a direct correlation between the hydroxyl content of the hydroxyl-terminated polydiorganosiloxanes used as filler treating agent relative to the weight of filler and the absence of gel particles in cured elastomers prepared from the composition. This hydroxyl content is preferably from about 0.8 to about 4.0 weight percent, based on the weight of filler.

OPTIONAL INGREDIENTS

In addition to the polydiorganosiloxane(s) and reinforcing filler a number of additional ingredients can be added during the present method, depending upon the properties desired in the cured elastomer prepared using the present compositions. These additional ingredients include but are not limited to extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as antimony compounds, hydrated aluminum oxide, magnesium compounds and halogenated hydrocarbons, adhesion promoters and resinous organosiloxane copolymers as reinforcing agents. These resinous reinforcing agents typically contain trimethylsiloxy, dimethylvinylsiloxy and $SiO_{4/2}$ units, and are well known materials. Other resinous organosiloxane copolymers containing phenylsiloxane units can be present to impart heat stability and improve the compression set of cured elastomers prepared from the present compositions.

THE MIXING APPARATUS

Any mixing apparatus capable of maintaining the reinforcing filler in a fluidized state while blending the filler with the high consistency polydiorganosiloxane and applying sufficient shear to reduce the size of the resultant filler-coated polymer particles to a uniform powder can be used to carry out the process of this invention. Suitable mixers include but are not limited to Waring(R) blenders containing a high speed shearing blade at the bottom of a vertically oriented conical chamber and mixers manufactured by Rheinstahl Henschel AG, Kassel, Germany.

Mixer/granulators manufactured by Littleford Bros. Inc. Florence, Ky. are preferred mixing devices. These mixers are referred to as "plow" or "plowshare" mixers due to the presence of at least one triangular or "T"-shaped blade "plow" blade located in a horizontally oriented cylindrical mixing chamber. The plow blade rotates on the horizontal axis of the chamber with the edge of the blade close to the perimeter of the chamber. In addition to maintaining the silica in a fluidized state and uniformly dispersing the polymer particles throughout the silica to achieve a homogeneous blend, the plow blade is also believed to agglomerate the ultimate particles produced by the high speed shearing blade(s), also referred to as chopper blades, present in the chamber to achieve the desired final particle size.

The speed of the plow blade required to maintain the silica in a fluidized form is typically from 30 to about 200 revolutions per minute, and is dependent upon the capacity of the mixing chamber and the particle size range of the final powder. A speed of from 80 to 180 revolutions per minute is preferred using a 130 liter-capacity mixing chamber. The speed would be proportionately slower for a larger capacity mixer.

The mixing chamber also contains at least one high speed chopping blade to provide the shearing force required to reduce the particle size of polydiorganosiloxane to a fine powder. A preferred embodiment of a mixing chamber contains at least one conical array of 5 blades rotating on a single shaft and ranging in diameter from 6 to 9 inches (15 to 23 cm), the smallest diameter blade being located closest to the mixer wall.

It is believed that the speed of the chopping blade(s) should be between about 2000 to about 4000 revolutions per minute when it is desired to prepare a composition of the present invention with a processing time of up to 30 minutes. The processing time period may vary somewhat depending upon the radius of the blade and the volume of material in the mixer. Smaller diameter blades typically must rotate at a higher speed to impart the same level of shear to the filler/polymer mixture. To minimize processing time it is preferable to use the longest chopper blades that will not interfere with rotation of the plow blades located on either side of the chopper blades.

PREPARATION OF POWDERED ORGANOSILOXANE COMPOSITIONS

In accordance with the present method for preparing organosiloxane compositions in the form of a flowable powder, at least a portion of the reinforcing filler is maintained in a highly turbulent, fluidized state in the mixing apparatus by stirring or otherwise agitating the filler particles sufficiently to entrap the air or other gas in the chamber of the mixer between the filler particles and maintain the particles suspended in the mixing chamber. The suspended filler particles assume the characteristics of a fluidized bed with respect to the ability of the suspended filler particles to rapidly coat the polydiorganosiloxane that is added to the mixing apparatus together with or shortly following addition of the reinforcing filler. The initial particle size of the polydiorganosiloxane is rapidly reduced by the chopper blades as the particles are being coated with the reinforcing filler.

It appears that the initial particle size of the polydiorganosiloxane added to the mixing chamber does not substantially alter processing time or the properties of either the flowable powder or cured elastomers prepared from this powder. The form of the initial polydiorganosiloxane can range from a finely divided powder to the largest size pieces that can be placed in the mixer chamber.

Any additional ingredients referred to in the preceding section of this specification can be added to the mixing chamber together with the filler or with the polydiorganosiloxane.

To eliminate or at least minimize the presence of gel particles in the cured elastomer a mixture of reinforcing filler and polydiorganosiloxane should be subjected to sufficient mixing action to achieve a fluidized state and heated to a temperature of greater than 100° up to 200° C., preferably from 105° to 150° C., within about one minute after these ingredients are combined.

In accordance with a preferred method, the particles of reinforcing filler are fluidized and heated to a temperature above 100° C. before the polydiorganosiloxane is added.

The present inventors discovered that the physical properties of elastomers prepared from the present compositions are maximized using the preferred Littleford mixer if all of the polydiorganosiloxane is added as a single portion rather than gradually over a period of time.

If the reinforcing filler is silica or other material requiring reaction with a filler treating agent, also referred to as an anti-creping agent, and the filler has not been reacted prior to being blended with the polydiorganosiloxane in accordance with the present method, the treating agent can be added as the polydiorganosiloxane is being blended with the filler. A preferred method for adding the treating agent at this point in the present process is to spray it into the chamber of the mixing apparatus. When untreated filler is used to prepare the present compositions, the filler should be heated to a temperature of at least 100° C. before being reacted with the treating agent.

In a preferred embodiment of the present method, to reduce the capacity of the mixing chamber required to prepare a given amount of the present product, only a portion of the filler is added initially, due to the large increase in filler volume during fluidization. This volume decreases substantially as the silica densifies and coats the polydiorganosiloxane in the mixing chamber. The remaining filler is initially placed in a hopper or other suitable dispensing container and allowed to drop into the chamber as the volume of silica initially present in the mixer decreases to densification and coating of the polydiorganosiloxane particles. This method of filler addition utilizes the full volume of the mixing chamber throughout the process of preparing the finely divided organosiloxane composition.

In some instances, particularly when volatile filler treating agents are used, it is desirable to maintain a flow of an inert gas such as nitrogen through the mixer chamber for at least a portion of the present method.

One way of following the reduction and subsequent increase in the particle size of the polydiorganosiloxane that occurs during the present method is by plotting the amount of electrical power consumed by the motor(s) driving the chopper blades as a function of time. This power consumption level increases sharply following addition of the polydiorganosiloxane(s) and reaches a maximum when all of the reinforcing filler has entered the mixer chamber, which for a 130 liter capacity Littleford mixer requires from 1 to about 20 minutes, depending upon the amount of filler and the capacity of the mixer chamber. Once all of the silica or other reinforcing filler has entered the mixer chamber the power consumed by the chopper blade motor(s) decreases at about the same rate that it increased as the filler was entering the mixer chamber.

There is a noticeable levelling off, referred to as a plateau, in the downward slope of the power consumption curve for the chopper motor(s) that occurs from about 2 to about 50 minutes after addition of the polydiorganosiloxane, depending at least in part on the capacity of the mixer chamber and the speed of the plow and chopper blades. Beyond this plateau the power consumed by the motor(s) driving the plow blades begins to increase. The plateau in the power consumption curve of the chopper blade motor has been found to correspond to the minimum particle size of the filler-coated polydiorganosiloxane particles. At this point the particles of filler-coated polydiorganosiloxane are aggregates measuring from 10 to about 700 micrometers in diameter with an ultimate particle size of from 2 to about 100 micrometers.

If the blending operation is allowed to proceed to the point where the power consumption rate of the plow blade motor begins to increase, the present inventors discovered that the average particle size of the blend begins to increase as additional particle agglomeration occurs.

For some end use applications it may be desirable to use a larger particle size than the minimum one indicated by the aforementioned plateau in the chopper blade motor power consumption curve. Because of the high level of reproducibility of the present method, if the processing conditions are not altered, the particle size corresponding to a given distance from the plateau of the chopper motor power consumption curve can be predicted with a high degree of accuracy.

When the desired particle size has been achieved, as indicated from the power consumption curve or by visual examination of the product, either of two options are available. The first option includes heating of the reactor is discontinued while the plow and chopper blades are rotated until the temperature of the product decreases to 60 degrees or less. Continuation of mixing as the product cools ensures uniformity of the final powder. The cooled material then can be discharged from the mixer. The second option involves simply discharging the hot material from the mixer. Preferred mixers are equipped with a door at the bottom of the mixer chamber to facilitate removal of the cooled product.

The free-flowing powder compositions prepared using the present method can be stored for extended periods of time at temperatures up to about 40° C. without undergoing any significant change in plasticity of the curable polydiorganosiloxane.

PREPARATION OF CURABLE COMPOSITIONS

Curable organosiloxane compositions in the form of flowable powders are prepared by blending a finely divided mixture of polydiorganosiloxane and reinforcing filler that has been prepared using the present method with any of the curing agents and/or curing catalysts conventionally used to cure organosiloxane compositions. The blending can be accomplished using the same type of equipment used to prepare the initial powder.

When it is desired to convert the resultant curable composition to an elastomer, the powder is converted to a conventional high consistency organosiloxane composition by compressing and fusing the powder particles. The fusion of the powder particles can be carried out using any of the equipment conventionally employed to process and fabricate high consistency organosiloxane elastomers. Suitable equipment includes but is not limited to two- and three-roll mills, sigma-blade mixers, extruders and screw-type compounders.

Alternatively, the curing agents and/or curing catalysts are added during fusion of the present organosiloxane compositions. Additional polydiorganosiloxane can also be added to the composition at this time.

The present inventors have discovered that when the present powder compositions are blended with additional polydiorganosiloxane during fusion to form a composition A, the physical properties of cured elastomers prepared from this composition are close to those exhibited by elastomers prepared by conventional means using the relative concentrations of ingredients in composition A. These properties are different from the properties exhibited by elastomers obtained from a conventionally prepared organosiloxane composition B that is subsequently blended with additional high consistency polydiorganosiloxane to achieve the relative concentration of ingredients present in composition A.

One type of curing agent suitable for use with the present organosiloxane compositions are organic peroxides. One class of organic peroxides are referred to vinyl-specific, and require the presence of vinyl or other ethylenically unsaturated hydrocarbon radical in the polydiorganosiloxane. The second major class of peroxides are referred to as non-vinyl specific, and react with any type of hydrocarbon radical to generate a free radical. Vinyl specific peroxides are typically alkyl peroxides such as 2,5-bis(t-butylperoxy)-2,3-dimethylhexane.

The present compositions can also be cured by a hydrosilylation reaction. In this instance the compositions are blended with an organohydrogensiloxane containing at least two silicon-bonded hydrogen atoms per molecule and a platinum-containing catalyst. The blending of the powder with the curing agent, curing catalyst and subsequent massing of the powder composition are conducted at temperatures below about 40° C. to maximize the working time of the composition. A platinum catalyst inhibitor can also be included to further increase working time.

Examples of preferred platinum-containing hydrosilylation catalysts include but are not limited to platinum compounds, platinum black, and platinum metal on various solid supports. A preferred platinum compound is chloroplatinic acid, such can be dissolved in a suitable solvent such as an alcohol containing from 1 to 4 carbon atoms. The chloroplatinic acid can be present as the free acid or as a complex with a liquid ethylenically unsaturated compound such as an olefin or an organosiloxane containing ethylenically unsaturated hydrocarbon radicals bonded to silicon. Complexes of chloroplatinic acid with the aforementioned organosiloxanes are described in U.S. Pat. No. 3,419,593, which issued to David N. Willing on Dec. 31, 1968. The relevant portions of this patent are incorporated herein by reference as a teaching of preferred catalysts.

The concentration of platinum-containing hydrosilylation catalyst in a curable finely divided organosiloxane compositions of this invention is equivalent to a platinum concentration of from 0.1 to 500 parts by weight of platinum metal, preferably from 1 to 50 parts by weight of platinum metal, per million parts (ppm), based on the combined weight of the polydiorganosiloxane containing vinyl or other alkenyl hydrocarbon radicals and the organohydrogensiloxane.

Curing does not proceed satisfactorily at below 0.1 ppm of platinum, while using more than 500 ppm results in no appreciable increase in cure rate, and is therefore uneconomical.

Because the present compositions can begin to cure even at temperatures as low as 25° C. even in the presence of a platinum catalyst inhibitor, if the compositions are to be stored for any length of time prior to being reacted it may be desirable to package the present compositions in two or more containers such that the organohydrogenpolysiloxane and the platinum-containing hydrosilylation catalyst are in separate containers.

When it is desired to prepare one-part compositions that can be stored for extended periods of time at temperatures up to about 40° C., known catalyst inhibitors typically will not provide this level of storage stability. In this instance it is usually necessary to encapsulate the catalyst in finely divided particles of a thermosetting polymer or a thermoplastic resin exhibiting a softening point or glass transition temperature of from 50° to 200° C. These particles will be also be referred to as microparticulate resin particles. In one embodiment the hydrosilylation reaction catalyst is present in the microparticulate resin as a core within a shell or skin of the thermoplastic resin.

In a second embodiment the hydrosilylation-reaction catalyst is dissolved or dispersed throughout the microparticulate resin.

The resin portion of the encapsulated catalyst microparticles can be any resin that is essentially impermeable to the hydrosilylation-reaction catalyst at least during the period of storage and is essentially insoluble in the organopolysiloxane referred to as ingredient A.

Thermoplastic resins are preferred for encapsulation of the hydrosilylation catalyst. These resins include but are not limited to acrylic resins, polystyrene, copolymers of styrene and acrylonitrile, methyl cellulose, silicone resins, and polysilane resins.

The hydrosilylation-reaction catalyst can be encapsulated within a microparticulate resin using any of the known methods. These methods include but are not limited to chemical methods such as interfacial polymerization and in-situ polymerization, physical-chemical methods such as coacervation and in-liquid drying, and physical-mechanical methods such as spray drying. Of these methods in-liquid drying and spray drying are preferred because they yield microparticles with a narrow particle size distribution in a relatively simple and straightforward manner.

The microparticles of catalyst-containing thermoplastic resin obtained using any of the methods described in the preceding paragraph can be used directly as a heat-activated hydrosilylation reaction catalyst. If it is desired to achieve a superior level of storage stability for the curable composition, it is preferable to wash the microparticulate resin with an appropriate washing solvent in order to remove any catalyst adhering to the surface of the resin particles. Suitable washing solvents should not dissolve the thermoplastic resin, but should be capable of dissolving the hydrosilylation catalyst. Examples of suitable washing solvents include but are not limited to alcohols such as methyl alcohol and ethyl alcohol and low-molecular-weight organopolysiloxanes such as hexamethyldisiloxane.

The average particle size for the microencapsulated catalyst should be within the range of from 0.01 to 100 micrometers, preferably within the range of from 0.1 to 10 micrometers. When the average particle size falls below 0.01 micrometer, there is a substantial decline in the yield of hydrosilylation-reaction catalyst obtained using known methods. When the average particle size exceeds 100 micrometers, the stability of the dispersed catalyst-containing microparticulate resin in the organopolysiloxane is impaired.

Compositions containing a microparticulate resin containing a platinum hydrosilylation catalyst can also include a platinum catalyst inhibitor.

PROPERTIES OF THE PRESENT BLENDS

Organosiloxane compositions in the form of flowable powders prepared in accordance with the present method are unique with respect to the ability of the compositions to retain their processability during extended storage periods, the absence of substantial changes with storage time of the physical properties of cured elastomers prepared from these compositions and the substantial absence of gel particles in both the fused uncured compositions and cured elastomers.

EXAMPLES

The following examples demonstrate the preparation of preferred curable organosiloxane compositions of this invention. The examples also demonstrate the lower gel content and higher level of physical properties in the cured elastomer that are achieved when the curable composition is prepared in accordance with the present method rather than using the process conditions taught in the prior art relating to the preparation of organosiloxane compositions in the form of a finely divided powder.

The examples should not be interpreted as limiting the scope of the invention defined in the accompanying claims. Unless otherwise indicated, all parts and percentages in the examples are by weight and Williams plasticity values are measured as described in the ASTM procedure.

PREPARATION OF CURABLE COMPOSITIONS

Curable organosiloxane compositions of this invention were prepared using the following general procedure:

The mixer used to prepare the compositions consisted of a 130 liter-capacity cylindrical mixing chamber equipped with four "T"-shaped scraper blades (referred to as plow blades) attached to a shaft located on the central axis of the cylinder. The edge of each blade rotated at a distance of 0.6 cm. from the perimeter of the cylindrical mixing chamber. From the wall of the mixing chamber projected a shaft on which was mounted a conical array of ten chopper blades arranged in sets of two mounted at an angle of 90° with respect to one another. The array consisted of two sets of two 6 inch-diameter blades, one set of two 7 inch-diameter blades and one set of two 9 inch-diameter blade. The smallest diameter blades were located closest to the wall of the mixer chamber.

The top of the mixer chamber contained a cylindrical stack through which material could enter or leave the chamber. The mixer was identified as model FM-130D, manufactured by Littleford Brothers, Inc.

The mixer chamber was equipped with a jacket that allowed the contents to be heated using steam or cooled using water or other liquid. Unless otherwise indicated in the following examples, all of the compositions were prepared using a chopper blade speed of 3400 RPM and a plough blade speed of 170 RPM.

EXAMPLE 1

This example demonstrates the effect of processing temperature on the gel content and physical properties of cured elastomers prepared using powdered blends of a polydiorganosiloxane and reinforcing silica.

Steam under a pressure of 70 psig (483 kPa) was passed through a jacket of the mixing chamber, which maintained the silica at 140° to 145° C. prior to addition of the polydiorganosiloxane. The flow of steam was continued throughout the mixing process.

With both the chopper and plough blades operating 1800 parts of a fume type reinforcing silica were added to the mixer chamber. When the silica had been fluidized and completely filled the chamber, 5875 parts of a high consistency dimethylvinylsiloxy-terminated polydimethylsiloxane containing 0.142 mole percent of methylvinylsiloxane units and exhibiting a Williams plasticity of from 140 to 170 were added to the mixer chamber in the form of strips measuring about 10 cm in width and 60 cm in length. After the addition of this material was completed a mixture of 646 parts of a hydroxyl terminated polydimethylsiloxane fluid having a viscosity of about 0.04 Pa.s at 25° C. and containing about 4 weight percent silicon-bonded hydroxyl radicals, 294 parts phenyltrimethoxysilane and 12 parts hexamethyldisilazane was sprayed into the mixer chamber.

Following addition of the filler treating agent a hopper containing 1370 parts of the same fume silica as initially placed in the mixer chamber was attached to the stack of the mixer and the silica allowed to enter the mixer chamber under its own weight. The stack was scraped following completion of silica addition to remove adhering silica. The plow and chopper blades were operated and steam circulated through the jacket of the mixer chamber for 22 minutes, at which time cooling water was circulated through the jacket of the mixer chamber and operation of the plow and chopper blades continued until the temperature of the material in the chamber reached 60° C. At this point in the process the material in the mixer chamber was a finely divided powder having an particle size of from 50 to 200 micrometers.

Test samples were fabricated by fusing this powder composition using a two roll rubber mill with the roll spacing adjusted to 0.025 inch (0.64 mm) and a roll temperature of 25° C. Samples for plasticity measurement, curing and gel content determination were milled for between 5 and 7 minutes, at which time a sheet of the material was removed from the mill.

Cured elastomers were prepared by blending 100 parts of the milled material with 1.2 parts of a mixture available as Varox(R) V-507 containing 2,5-bis(t-butyl-peroxy)2,5-dimethylhexane and 55 weight percent of inert ingredients. The resultant composition was cured by heating it in a press for 10 minutes at a temperature of 171° C. and under a pressure of 60,000 psig (414 MPa). Samples for the various physical property measurements were cut from the resultant sheet of cured elastomer and post cured by heating for 4 hours at 200° C.

The gel content of cured organosiloxane composition was determined by blending 100 parts of the powdered organosiloxane composition, 1.2 parts of a mixture containing 2,5-bis(t-butylperoxy)2,5-dimethylhexane and 55 weight percent of inert ingredients, and 1 part of a red pigment available as CP-17 from Sanyo Color Works, Ltd. A quantity of this mixture was placed between 2 sheets of Mylar(R) film and pressed for 5 minutes at a temperature of 175° C. and under a pressure of 60,000 psig. The resultant sample of cured elastomer was visually examined to determine the presence of unpigmented areas, which result from the inability of gelled polymer to absorb dye. The samples were rated against a set of standard samples rated from 1 (small concentration of gel particles) to 10 (largest concentration of gel particles, more than about 1000 particles in sample).

To simulate actual storage conditions the final powder was allowed to remain for one week under ambient conditions before being evaluated. The results of the evaluations are reported in Table 1, together with the time required to reach the same point in the mixing cycle, as determined by identical points on the plot of power consumption against time.

For purposes of comparison two additional samples of powdered organosiloxane composition were prepared at temperatures outside the present limits. In one instance the sample was prepared under ambient conditions, with neither water nor steam being circulated through the jacket of the mixer chamber. The maximum temperature within the chamber reached 55° C. In the second instance the water was cooled sufficiently to maintain the maximum temperature in the mixer chamber at 25° C.

TABLE 1

| Mixer Temp. | Time (min) | Cal[1] | Williams Plasticity[2] | Cured Elastomer Properties | | | | |
|---|---|---|---|---|---|---|---|---|
| | | | | Gel Content | Durometer | Elong. (%) | Tensile Strength (MPa) | Tear Strength kN/m |
| 150 | 25 | 0.015 | 142 | 1 | 69 | 465 | 9.2 | 21.8 |
| 55(c) | 29 | 0.025 | 95 | 6 | 60 | 547 | 8.6 | 19.9 |
| 23(c) | 32 | 0.025 | 102 | 6 | 60 | 539 | 8.5 | 19.4 |

[1]Cal = minimum distance in inches between mill rolls required to obtain a coherent sheet
[2]measured one hour after removal from mixer

EXAMPLE 2

This example describes the preparation and curing of powder compositions containing an organohydrogensiloxane as the curing agent and a microencapsulated platinum compound as the curing catalyst.

21 parts of a fume silica having a nominal surface area of 250 m$^2$ per gram were placed in the mixer chamber. Nitrogen was then passed through the mixer chamber for five minutes at a flow rate of 120 cubic feet per hour. The flow rate was then reduced to 10 cubic feet per hour, the chopper and plow blades were operated and steam was passed through the mixer chamber jacket. After 6 minutes a filler treating agent consisting essentially of mixture of (1) 9.75 parts of a hydroxyl terminated polydimethylsiloxane fluid having a viscosity of about 0.04 Pa.s at 25° C. and about 4 weight percent silicon-bonded hydroxyl radicals and (2) 0.13 part of a hydroxyl-terminated dimethylsiloxane/methylvinylsiloxane copolymer containing about 10 weight percent of vinyl radicals and about 12 weight percent of hydroxyl groups was sprayed into the mixer chamber through an atomizer nozzle. While addition of the filler treating agents was in progress, a mixture of (1) 73.5 parts of a dimethylvinylsiloxy-terminated polydimethylsiloxane gum containing 0.142 mole percent of methylvinylsiloxane units and exhibiting a Williams plasticity number of about 150, (2) 23.5 parts of a dimethylvinylsiloxy-terminated polydimethylsiloxane exhibiting a Williams plasticity number of about 140, (3) 3 parts of a liquid dimethylvinylsiloxy terminated polydimethylsiloxane exhibiting a viscosity of about 55 Pa.s at 25° C. and (4) and 1.75 parts of a resinous organosiloxane copolymer containing 7.2 mol percent of $CH_3SiO_{3/2}$ units, 24 mol percent of $(CH_3)_2SiO$ units, 3.2 mol percent of $(CH_3)_3SiO_{\frac{1}{2}}$ units 15.4 mol percent of $(CH_2=CH)(CH_3)SiO$ units and 50 mol percent of monophenylsiloxy units was added to the mixer chamber through the stack over a 5 minute period. Following completion of this addition 20 parts of silica were placed in a hopper attached to the stack of the mixer chamber and allowed to fall into the mixer chamber. After fifteen minutes of operation the temperature in the mixer chamber was 126° C.

When the plow and chopper blades had been in operation for about 17.5 minutes the nitrogen flow rate was increased to 120 cubic feet per minute and the temperature in the mixer chamber was 124° C.

Following 3.5 minutes of mixer operation 1.1 parts of a curing agent for the composition, consisting essentially of an organosiloxane copolymer containing 54 mol percent methylhydrogensiloxane units, 13 mol percent of trimethylsiloxy units, 29 mol percent of dimethylsiloxane units and 4 mol percent of monomethylsiloxy units, was added to the mixer chamber followed by 0.046 part of 1-ethynyl-1-cyclohexanol as the platinum catalyst inhibitor. The steam supply to the mixer jacket was then discontinued while operation of the plow and chopper blades was continued for another 2.5 minutes, at which time the powder composition in the mixer chamber was transferred to a container. The size of the particles ranged from 0.5 to 4 mm. Some particle agglomeration was present, however the composition was free-flowing.

One portion of the final powder was fused on a two roll mill to form a coherent sheet. This will be referred to as sample 1.

A second portion of the powder was fused after being combined with 0.12 weight percent of a platinum-containing hydrosilylation catalyst that had been microencapsulated in an organosiloxane copolymer containing 22 mol percent of dimethylsiloxane units and 78 weight percent of monophenylsiloxane units. The catalyst was a reaction product of hexachloroplatinic acid and sym-tetramethyldivinyldisiloxane and was present in the microcapsules at a concentration equivalent to 0.4 weight percent platinum. This will be referred to as sample 2.

A third portion of the powder was shaken together with the same concentration of microencapsulated catalyst as the second portion. This third portion was not milled prior to storage, and will be referred to as sample 3.

A fourth portion (sample 4) of powder was neither milled nor blended with the microencapsulated catalyst.

For purposes of comparison a high consistency organosiloxane composition was prepared by blending in a sigma blade mixer all of the ingredients used to prepare the powder composition and fabricating the resultant fused high consistency organosiloxane composition on a two roll mill to from a sheet (comparative sample A). A second comparative sample (comparative sample B) was prepared in the same manner but omitting the microencapsulated catalyst.

Portions of the six samples were stored at 40° C. The plasticity of the samples was measured at the periods listed in Table 2. The results of the plasticity measurements are recorded in this table.

Sample 2 and comparative sample A were cured by heating them for 10 minutes at a temperature of 170° C. The durometer, tensile strength, elongation and compression set were measured using the appropriate ASTM testing procedures and the results are recorded in Table 3. The cured samples were heat aged at 225° C. for 70 hours and the physical properties were again measured and are recorded in Table 3.

TABLE 2

| Sample | Plasticity (mmx100) at 40° C. | | |
|---|---|---|---|
| | 14 Hr. | 17 Days | 28 Days |
| 1 | 191 | 173 | 175 |
| 2 | 188 | 180 | 183 |
| 3 | 201 | 196 | 196 |
| 4 | 203 | 196 | 188 |
| A | 157 | 163 | 160 |
| B | 160 | 157 | 157 |

TABLE 3

| Sample | Durometer (Shore A) | Tensile Strength (MPa) | Elongation (%) | Compression Set (%) |
|---|---|---|---|---|
| 2 (Initial) | 58 | 9.0 | 569 | 54 |
| (Heat Aged) | 64 | 4.6 | 265 | ND |
| A (Initial) | 50 | 9.1 | 597 | 36 |
| (Heat Aged) | 58 | 5.3 | 307 | ND |

ND = Not Determined

EXAMPLE 3

This example demonstrates the similarities between the properties exhibited by uncured and cured elastomers prepared from the present powder compositions and elastomers prepared using conventional methods and equipment for preparing high consistency organosiloxane compositions.

The mixer used in this example was a 1200 liter capacity Littleford mixer equipped with a conical array of one 7 inch (17.8 cm) diameter, two 6 inch (15.2 cm) diameter and two 4 inch (10.2 cm) diameter chopper blades.

Steam under a pressure of 75 psig was passed through the jacket of the mixer for about ten minutes. 11 parts of a fume silica having a nominal surface area of 250 $m^2$ per gram were placed in the mixer chamber and the current of nitrogen at a flow rate of 600 cubic feet per hour was passed through the chamber for ten minutes. The nitrogen flow rate was then reduced to 100 cubic feet per hour, the plow blade was operated at a speed of 115 rpm and the chopper blades at 1725 rpm.

50 parts of a dimethylvinylsiloxy-terminated polydimethylsiloxane gum containing 0.142 mole percent of methylvinylsiloxane units and exhibiting a Williams plasticity number of 150 and 50 parts of a dimethylvinylsiloxy-terminated polydimethylsiloxane exhibiting a Williams plasticity number of about 140 were then added through the stack of the mixer. While this addition was in progress a mixture of (1) 10 parts of a hydroxyl-terminated polydimethylsiloxane containing 10 weight percent of silicon-bonded hydroxyl groups, (2) 1.1 part of a hydroxyl-terminated dimethylsiloxane/methylvinylsiloxane copolymer containing about 10 weight percent of vinyl radicals and about 12 weight percent of hydroxyl groups and (3) 0.5 part of hexamethyldisilazane was sprayed into the mixer chamber through an atomizing nozzle.

When the initial silica level had lowered the remaining 44 parts of fume silica were placed in a hopper attached to the stack of the mixer and allowed to drop into the mixer chamber as space allowed.

After 40 minutes of mixer operation the rate of power consumption by the plow blade began to increase. At this time the contents of the mixing chamber were discharged into a receiving container and operation of the plow and chopper blades mixer was discontinued.

The powder obtained from the mixer exhibited a particle size of from 200 to 800 microns and a bulk density of 607 g/liter. The maximum temperature achieved in the mixer chamber during preparation of the powder was 149° C.

The powder was massed to form a high consistency organosiloxane composition using a sigma blade mixer. A curable composition was prepared by blending the composition with 0.6 weight percent of a mixture containing 95 weight percent of dicumyl peroxide and 5 weight percent of inert ingredients on a rubber mill. Test specimens were cut from the resultant sheet and cured by heating for 10 minutes at 150° C.

The plasticities of the uncured compositions and the physical properties of the cured elastomer were compared with those of an elastomer obtained by curing under the same conditions a high consistency organosiloxane composition prepared by blending the ingredients of the composition in a sigma-blade mixer. The plasticities were measured 1 hour and 1 week after the compositions had been prepared.

The physical properties of the two cured elastomers are recorded in Table 4. Sample 5 was prepared by massing the powder composition of this invention and comparison sample C was prepared from the curable composition prepared in the conventional manner using the sigma blade mixer.

TABLE 4

|  | Sample 5 | Sample C |
| --- | --- | --- |
| Uncured Properties |  |  |
| Plasticity |  |  |
| 1 Hour | 325.1 | 307.3 |
| 1 Week | 348.0 | 325.1 |
| Cured Properties |  |  |
| Durometer (Shore A Scale) | 72 | 70 |
| Tensile Strength (MPa) | 11.0 | 10.0 |
| Elongation (%) | 448 | 424 |

That which is claimed is:

1. A storage stable and gel free organosiloxane composition in the form of a powder, where said composition is prepared by a method comprising the following sequence of steps:
   1) forming a mixture comprising 100 parts by weight of a high consistency polydiorganosiloxane, and from 10 to 80 parts of a finely divided reinforcing filler by maintaining said filler in a highly turbulent, fluidized state and at a temperature of above 100° up to 200° C. prior to or immediately following blending of said filler with said polydiorganosiloxane,
   2) maintaining said temperature and highly turbulent, fluidized state while subjecting said mixture to shearing forces sufficient to achieve an average particle size of from 1 to 1000 microns, and
   3) isolating the resultant organosiloxane composition in the form of a flowable powder.

2. A composition according to claim 1 where the William plasticity of said polydiorganosiloxane is from 150 to 500, said organic groups are selected from the group consisting of alkyl, substituted alkyl, cycloalkyl, alkenyl, and aromatic hydrocarbon radicals, said reinforcing filler is silica, and said mixture is maintained at a temperature of from 105° to 150° C.

3. A composition according to claim 2 where said organic groups are selected from the group consisting of alkyl and halogenated alkyl radicals containing from 1 to 4 carbon atoms, alkenyl radicals containing from 2 to 10 carbon atoms and aryl radicals, and the silica is treated with an anti-creping agent.

4. A composition according to claim 3 where said organic groups are selected from the group consisting of methyl, 3,3,3-trifluoropropyl, phenyl, vinyl and 5-hexenyl.

5. A composition according to claim 3 where said composition contains an amount of a curing agent for said polydiorganosiloxane sufficient to convert said composition to an elastomer.

6. A composition according to claim 5 where said curing agent is an organic peroxide selected from the group consisting of vinyl specific and non-vinyl specific peroxides.

7. A composition according to claim 5 where said curing agent is an organohydrogensiloxane containing at least two silicon-bonded hydrogen atoms per molecule, said polydiorganosiloxane contains at least two alkenyl radicals per molecule and said composition includes a hydrosilylation catalyst selected from the group consisting of metals from the platinum group of the periodic table and compounds of said metals, where the amount of said catalyst is sufficient to promote curing of said composition.

8. A composition according to claim 7 where said composition contains an inhibitor for said hydrosilylation catalyst.

9. A composition according to claim 7 where said hydrosilylation catalyst is microencapsulated within at least one layer of a thermoplastic polymer selected from the group consisting of organic polymers and polyorganosiloxanes.

10. A composition according to claim 9 where said composition contains an inhibitor for said hydrosilylation catalyst.

* * * * *

UNITED STATES PATENT AND TRADEMARK OFFICE
CERTIFICATE OF CORRECTION

PATENT NO. : 5,153,238

DATED : Oct. 6, 1992

INVENTOR(S) : Carl Joseph Bilgrien; Chi-long Lee; Steven Patrick Mullan; Herschel Henry Reese;

It is certified that error appears in the above-identified patent and that said Letters Patent is hereby corrected as shown below:

Column 5, lines 46 and 47 - Delete "hexaorganodisiloxanes"

Column 5, line 38 - Delete "decrease" and replace with -- increase --.

Column 6, line 13 - Delete "This hydroxyl content is preferably from about 0.8 to about 4.0 weight percent."

Column 7, line 44 - Delete the sentence "The initial particle size of the polydiorgansiloxane is rapidly reduced by the chopper blades as the particles are being coated with the reinforcing filler."

Column 8, lines 27 and 28 - Delete "and coats the polydiorganosiloxane in the mixing chamber".

Column 8, lines 32 and 33 - Delete "to densification and coating of the polydiorganosiloxane particles" and substitute therefor -- due to densification of the polydiorganosiloxane particles --.

Column 8, line 67 - Delete "filler-coated"

Column 9, line 1 - Delete "filler-coated"

Signed and Sealed this

Tenth Day of October, 1995

*Attest:*

BRUCE LEHMAN

*Attesting Officer*        *Commissioner of Patents and Trademarks*